US007644232B2

(12) United States Patent
Jung et al.

(10) Patent No.: US 7,644,232 B2
(45) Date of Patent: Jan. 5, 2010

(54) CACHE METHOD AND CACHE SYSTEM FOR STORING FILE'S DATA IN MEMORY BLOCKS DIVIDED FROM CACHE MEMORY

(75) Inventors: Min-woo Jung, Seoul (KR); Chun-un Kang, Seoul (KR); Ki-won Kwak, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 11/502,384

(22) Filed: Aug. 11, 2006

(65) Prior Publication Data
US 2007/0050551 A1 Mar. 1, 2007

(30) Foreign Application Priority Data
Aug. 24, 2005 (KR) ...................... 10-2005-0077887

(51) Int. Cl.
*G06F 12/00* (2006.01)
(52) U.S. Cl. ...................... 711/118; 711/129; 711/166; 711/170
(58) Field of Classification Search ................. 711/118, 711/129, 141, 165–166, 170
See application file for complete search history.

(56) References Cited

U.S. PATENT DOCUMENTS

| 5,584,014 A | 12/1996 | Nayfeh et al. |
| 6,493,800 B1 | 12/2002 | Blumrich |
| 6,842,824 B2 * | 1/2005 | Yamauchi et al. ........... 711/133 |

FOREIGN PATENT DOCUMENTS

| JP | 2002-511170 A | 4/2002 |
| JP | 2003-122634 A | 4/2003 |
| KR | 1999-0040197 A | 3/2000 |
| KR | 10-2004-0076313 A | 9/2004 |

* cited by examiner

Primary Examiner—Jasmine Song
(74) Attorney, Agent, or Firm—Sughrue Mion, PLLC

(57) ABSTRACT

A cache method and a cache system for storing file's data in memory blocks divided from a cache memory are disclosed. The cache method for storing data of a file in memory blocks divided from a cache memory includes: receiving a request command for first data of a first file from an application; retrieving a memory block that stores the first data; setting reference information which indicates that the memory block storing the first data is referred to by the application; transmitting the first data stored in the memory block to the application; and resetting the reference information for the memory block that stores the first data.

20 Claims, 5 Drawing Sheets

CACHE METHOD AND CACHE SYSTEM FOR STORING FILE'S DATA IN MEMORY BLOCKS DIVIDED FROM CACHE MEMORY

CROSS-REFERENCE TO RELATED APPLICATIONS

This application claims priority from Korean Patent Application No. 10-2005-0077887 filed on Aug. 24, 2005 in the Korean Intellectual Property Office, the disclosures of which are incorporated herein by reference in their entirety.

BACKGROUND OF THE INVENTION

1. Field of the Invention

The present invention relates to a cache memory of a server system that provides mass storage files, and more particularly to a cache method and a cache system for storing file's data in memory blocks divided from a cache memory.

2. Description of the Prior Art

With the increase of multimedia streaming service, a server that provides mass storage files in real time requires efficient loading of the files in a memory. Such loading serves as a main factor that determines performance of the server. Particularly, multimedia service that increases network load is essentially required to reduce processing time of the server so as to reduce delay due to a high volume of network load. To this end, a part of files for streaming is loaded in the memory and the loaded data continues to be maintained so that the time required to read files from a file storage could be reduced. Such a memory is called a cache memory.

FIG. 1 illustrates a structure of a cache system in a conventional streaming server. In FIG. 1, the cache system 30 includes a cache memory 10, a file data reader 11, a cache management module 12, and a memory allocation module 20. The memory allocation module 20 allocates memory constituting a cache from a memory of the system and provides access information on the allocated memory to the cache management module 12.

If data is requested from an application 15, the cache management module 12 identifies whether the requested data is stored in the cache memory 10. If so, the cache management module 12 copies the data and provides the copied data to the application 15. If not so, the cache management module 12 reads the data from the file data reader 11, stores the data in the cache memory 10, and provides the data to the application 15.

The cache memory 10 has access information on the allocated memory and information on which files data is stored and which part of the files the data is stored, in addition to the data read from the file data reader. The cache memory 10 sequentially stores the data provided from the cache management module 12, and if the data requested from the application 15 exists in the previously stored data, the cache memory 10 provides the corresponding data to the application 15. The file data reader 11 reads the data from a file memory 50 and provides the read data to the cache management module 12.

The case where the data is read from the file memory 50 will now be described. First, the memory allocation module 20 generates an available memory and provides the generated memory to the cache memory 10 (a in FIG. 1). Then, the application 15 requests data of a specific file (b). In this case, the file data reader 11 reads desired data from the file memory 50 and then provides the read data to the cache management module 12 (c). The cache management module 12 provides the read cache data to the cache memory 10 (d) and transmits the data to the application 15 (f).

In an instance where the requested data is read from the cache memory 10, the application 15 initially requests the cache management module 12 to provide data of a specific file so as to read the data stored in the cache memory (b). The cache management module 12 reads the requested data from the cache memory (e). The read data is provided to the application 15.

Therefore, since the cached data is read through the cache management module 12 and the cache memory 10 without having to go through the file memory 50 and the file data reader 11, the reading speed is faster than in the case where the data is read from the file memory 50.

FIG. 2 illustrates the state in which the files are stored in the conventional cache memory. A reference block 61 denotes the memory state before caching the data. If a file 1 is to be cached, data is sequentially stored in the cache memory as shown in a reference block 62. If a file 2 is to be cached, contents of the file 1 are deleted and data of the file 2 are stored in the memory. Thus, only the file 2 exists in the cache memory as shown in a reference block 63. Subsequently, if another file stored in the memory is to be cached in a random access mode, the existing data of file 2 is deleted from the cache and the new file data is stored, as shown in a reference block 64.

As such, the conventional cache system has several problems. That is, if the cache randomly accesses the file or multiple applications each requests a different part of the file, it is necessary to delete the existing cache data and load the cache with new data. Also, since data that is not a memory pointer within the cache is transmitted to the application, its performance may deteriorate. Moreover, in the case where a plurality of applications access the cache, the memory in use may be erased without backup.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention is to provide an efficient mass storage cache system that allows random access of a plurality of files.

Another aspect of the present invention is to provide a cache method in which memory update and access per block do not affect other blocks and efficient data indexing is made based on position information of a file.

Additional features and aspects of the present invention will be set forth in part in the description which follows and in part will become apparent to those having ordinary skill in the art upon examination of the following or may be learned from practice of the invention.

The present invention provides a cache method for storing data of a file in memory blocks divided from a cache memory, which includes receiving a request command for first data of a first file from an application; retrieving a memory block that stores the first data; setting reference information representing the memory block, which stores the first data, so that the first data is referred to by the application; transmitting the first data stored in the memory block to the application; and resetting the reference information for the memory block that stores the first data.

Another aspect of the present invention is to provide a cache system for storing data of a file in memory blocks divided from a cache memory, which includes a cache memory module for storing data read from a file per memory block; a block allocation module for allocating memory blocks of the cache memory module to store the data; and a cache management module for retrieving a memory block, which stores first data of a first file requested from an application, from the cache memory module, and transmitting the first data stored in the retrieved memory block to the application; wherein the memory block that stores the first data includes reference information including the number of applications that request the first data but fail to finish transmission of the first data.

BRIEF DESCRIPTION OF THE DRAWINGS

The above and other features and aspects of the present invention will become more apparent from the following detailed description taken in conjunction with the accompanying drawings, in which.

DETAILED DESCRIPTION OF THE EXEMPLARY EMBODIMENTS

Figure 1:
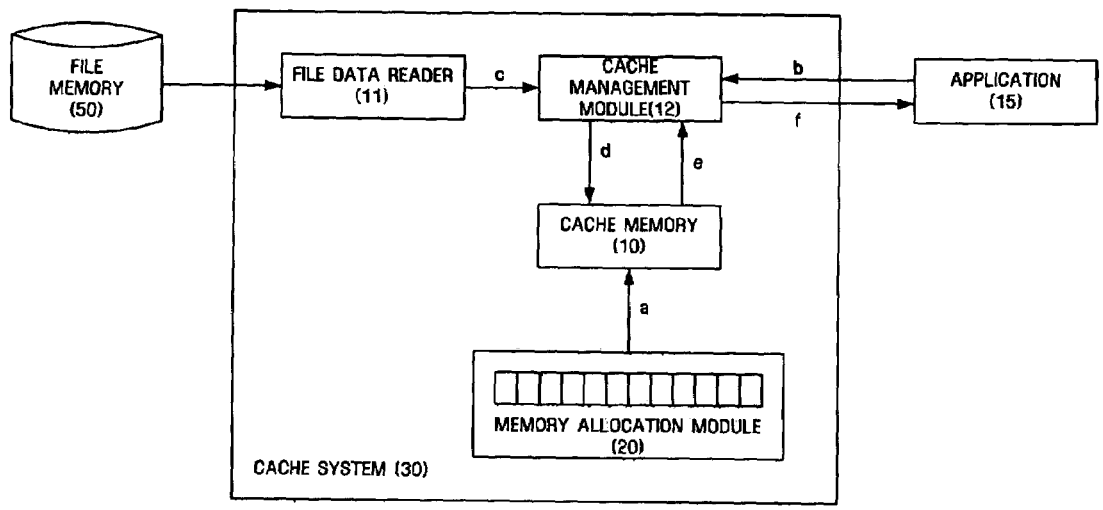
FIG. 1 is a view illustrating the structure of a cache system in a conventional streaming server.
Figure 2:
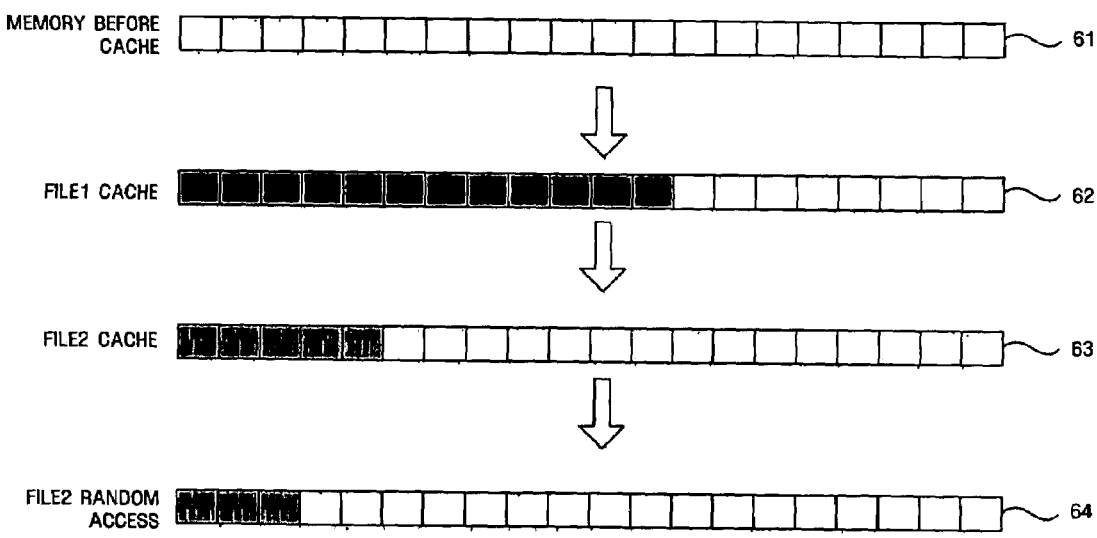
FIG. 2 is a view illustrating the state in which the files are stored in a conventional cache memory.

Certain exemplary embodiments of the present invention will be described in detail with reference to the accompanying drawings. The aspects and features of the present invention and methods for implementing the aspects and features will be apparent by referring to the exemplary embodiments to be described in detail with reference to the accompanying drawings. However, it will be apparent to those ordinarily skilled in the art that the present invention is not limited to the description of the exemplary embodiments provided herein. Further, the matters defined herein are described at a high-level of abstraction to provide a comprehensive yet clear understanding of the invention. In the following description of the present invention, the same drawing reference numerals are used for the same elements even in different drawings.

Hereinafter, a cache method and a cache system for storing data of a file in memory blocks divided from a cache memory according to an exemplary embodiments of the present invention will be described with reference to the accompanying drawings illustrating block diagrams and flowcharts. It will be understood by those ordinarily skilled in the art that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order in which they are described. For example, two blocks shown in succession may in fact be executed substantially concurrently or the blocks may sometimes be executed in the reverse order, depending upon the functionality involved.

Figure 3:
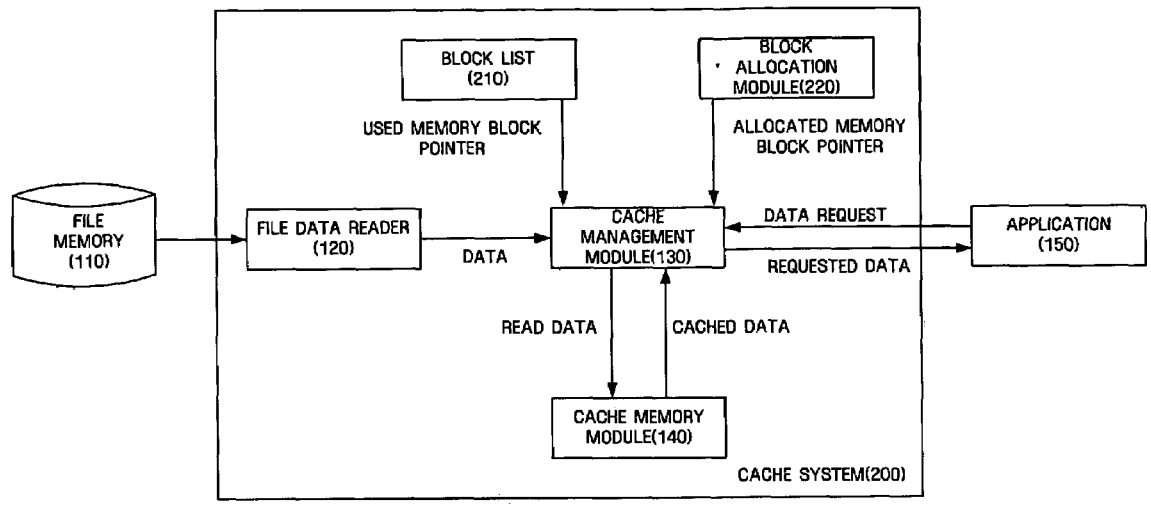
FIG. 3 is a view illustrating the structure of a cache system according to an exemplary embodiment of the present invention.

FIG. 3 illustrates the structure of a cache system according to an exemplary embodiment of the present invention. In this exemplary embodiment of the present invention, the term "unit", i.e., "module" or "table", as used herein, preferably refers to, but is not necessarily limited to a software or hardware component such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 3, the cache system according to one exemplary embodiment of the present invention includes a block allocation module 220, a block list 210, a cache management module 130, a cache memory module 140, and a file data reader 120.

The block allocation module 220 allocates memory blocks constituting cache from a memory of the system and provides pointers of the memory blocks to the cache management module 130.

The block list 210 maintains pointers of the memory blocks. At this time, a data structure of first in first out (FIFO) may be maintained to efficiently manage the memory blocks. If the memory blocks have been generated or used in accordance with a request of an application 150, a pointer of a corresponding memory block is linked to the last position of the block list. If no memory block for storing new data has been allocated any longer, the head of the block list is first retrieved to search for an available memory block, and the retrieved memory block is popped and used to store new data.

If cached data exists, the cache management module 130 retrieves a memory block that stores data from the cache memory module 140, and provides the retrieved memory block to the application 150. In contrast, if no cached data exists, the cache management module 130 receives pointers of the memory blocks from the block allocation module 220 and the block list 210 and copies file data. Then, the cache management module 130 transfers the data to the application 150 so that the data can be stored in the cache memory module 140.

The cache memory module 140 manages maps, which store the data of the file to be cached, as lists. Each of the maps manages pointer values of the memory blocks that store the file data. The map constitutes a key based on a position value of the data in the file.

The file data reader 120 reads the data from a file memory 110 and provides the read data to the cache management module 130.

Figure 4:
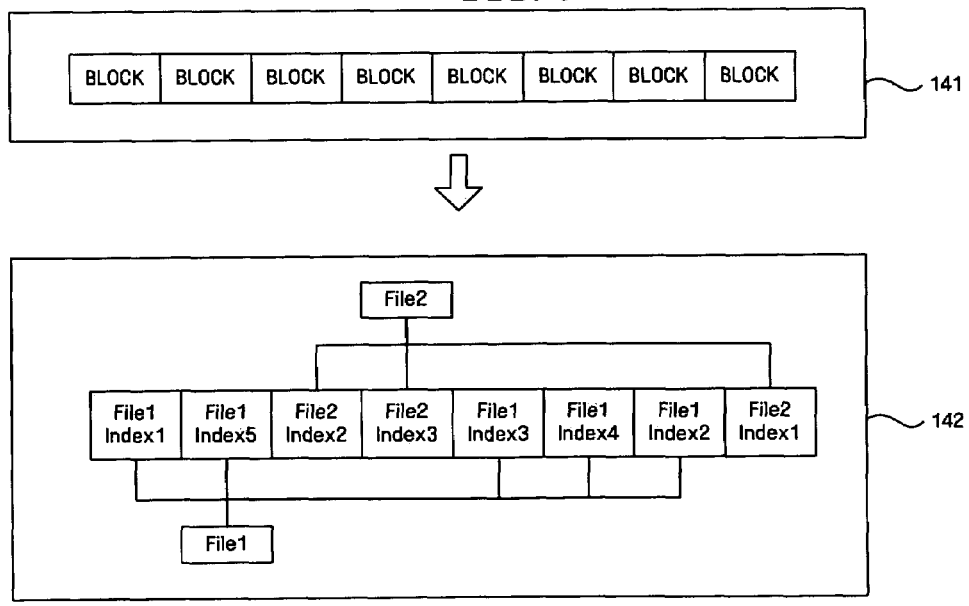
FIG. 4 is a view illustrating the structure of a memory before and after a cache according to an exemplary embodiment of the present invention.

FIG. 4 is a view illustrating a structure of a memory before and after a cache according to an exemplary embodiment of the present invention. Memory of the cache memory module 141 are comprised of memory blocks having constant sizes. Since these memory blocks reflect the state of memory prior to the storage of data, no data is stored in the memory blocks. Therefore, data can be stored in the memory blocks at any time. If the application requests a plurality of files from which data is to be provided, the memory blocks are sequentially allocated regardless of the position of the data in the files and types of the files so that the data is stored sequentially therein. File 1 and File 2 are stored in the memory blocks as shown in the reference block 142, and positions, index1 and index2 corresponding to the files are marked. The files are stored in the memory blocks regardless of file names and the order of positions within the files. A structure of each file manages the memory blocks allocated to the corresponding files. Index information shows where the data within memory blocks are located within the files.

The structure constituting the memory blocks is as follows. The structure is comprised of data to be stored in the memory blocks, the size of the data, the number of reference times, a file map, and a file map key.

```
typedef struct_BLOCK
{
unsigned char* Data[SIZE_OF_BLOCK];
int DataSize;
int RejCount;
void* FileMap;
int FileMapKey;
} BLOCK;
```

Among elements constituting the structure, Data stores data of a file for cache and DataSize represents the size of real file data stored in Data arrangement. If the memory blocks are of the same uniform size, DataSize can represent that the size of the data of the file to be stored in Data may be smaller than the size of the block. RefCount represents the number of applications that use the memory blocks. If there are applications that use the memory blocks, contents of the corresponding memory blocks are not deleted. FileMap represents a parameter of a map that manages the memory blocks. FileMapKey represents a key that indexes the memory blocks in the Map parameter.

A file structure that manages the memory blocks for each file is as follows.

```
typedef struct_FILEINFO;
{
int FileIndex;
void* FileMap;
} FILEINFO;
```

FileIndex represents file identification information, and FileMap represents a parameter of a map that preserves the memory blocks.

Figure 5:
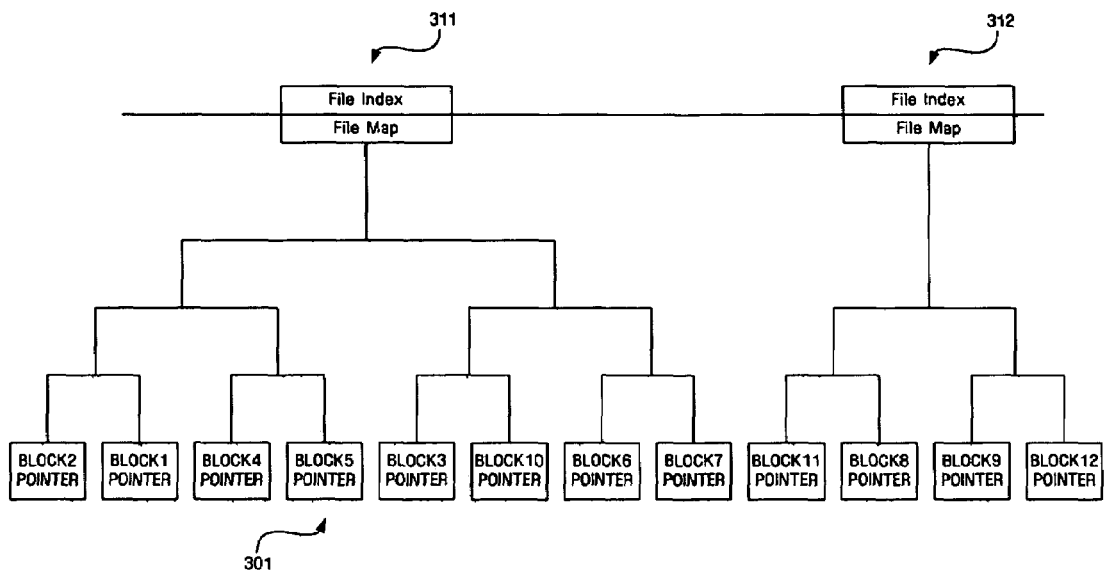
FIG. 5 is a view illustrating the structure of FILEINFO and BLOCK according to an exemplary embodiment of the present invention.

FIG. 5 illustrates a structure of FILEINFO and BLOCK according to an exemplary embodiment of the present invention.

Reference blocks 311 and 312 represent FILEINFO that constitutes a list of a file map. The file map manages data of a file to be cached.

The list of the file map is comprised of the structure of FILEINFO that includes a file index and a file map. Whenever a file to be cached is additionally provided, the structure of FILEINFO is added to the list of the file map. The file map may be comprised of key and value in pair, wherein key represents index that is indicative of the position of the data to be stored within the file and value represents a pointer of the memory block. The file map represents which memory block stores data corresponding to which part of the file.

Numbers in block pointers represent the order in which blocks are allocated. The order in which blocks are allocated is not identical to the position of the blocks stored in the map. Referring to FIG. 5, the blocks are sequentially listed depending on their position within the file. It is noted that block 2, block 1, block 4, and block 5 are sequentially allocated in the case of File 1 (311).

Figure 6:
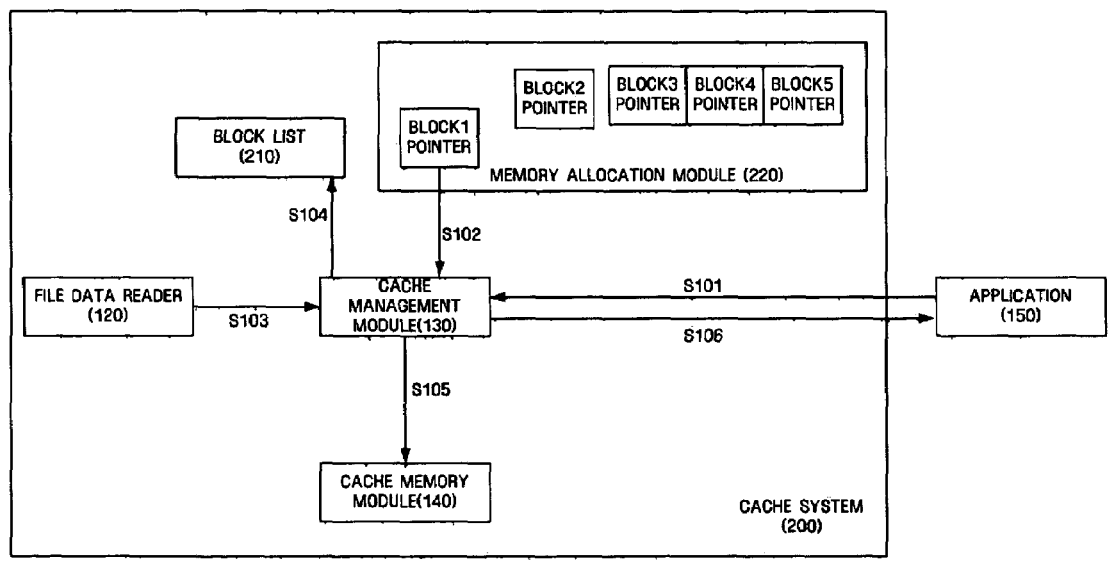
FIG. 6 is a view illustrating a procedure of allocating data to a cache if a redundant memory block exists according to an exemplary embodiment of the present invention.

FIG. 6 illustrates a procedure of allocating data to a cache if a redundant memory block exists according to an exemplary embodiment of the present invention. Since a redundant memory block exists, if the application requests a specific file, a memory block corresponding to the specific file is allocated. The whole procedure is as follows. If the application 150 requests data of a specific file, the cache management module 130 determines whether the data of the file requested from the application 150 is stored in the cache memory module 140. If the data of the file requested from the application 150 is not stored in the cache memory module 140, the cache management module 130 receives pointer information to allocate the memory blocks from the block allocation module 220 S102.

The file data reader 120 reads desired data from the file memory and copies the read data in the memory block S103. The pointer of the memory block is added to the block list 210 along with information representing that a specific part of a specific file has been stored in the corresponding memory block S104. At this time, the pointer of the memory block may be added to the last position of the block list 210 so that the first allocated memory block may first be converted to an available memory block. If there is no memory space that stores the requested file, the first allocated memory block may be converted to an available memory block. This will be described later with reference to FIG. 7.

The cache management module 130 stores the pointer of the memory block in a file map that matches the requested file S105. Then, the cache management module 130 can retrieve the memory block through information of the corresponding file map. The cache management module 130 transmits the pointer of the memory block to the application 150 that has requested data. Before transmitting the pointer of the memory block to the application 150, the cache management module 130 increases the value of RefCount by 1. The cache management module 130 decreases the value of RefCount by 1 once the application 150 finishes using the memory block. In this way, the cache management module 130 can identify whether the memory block is currently in use by examining the number of reference times (value of RefCount). Therefore, it is possible to prevent the memory block in use from being deleted even in the case where no available memory block is provided.

Figure 7:
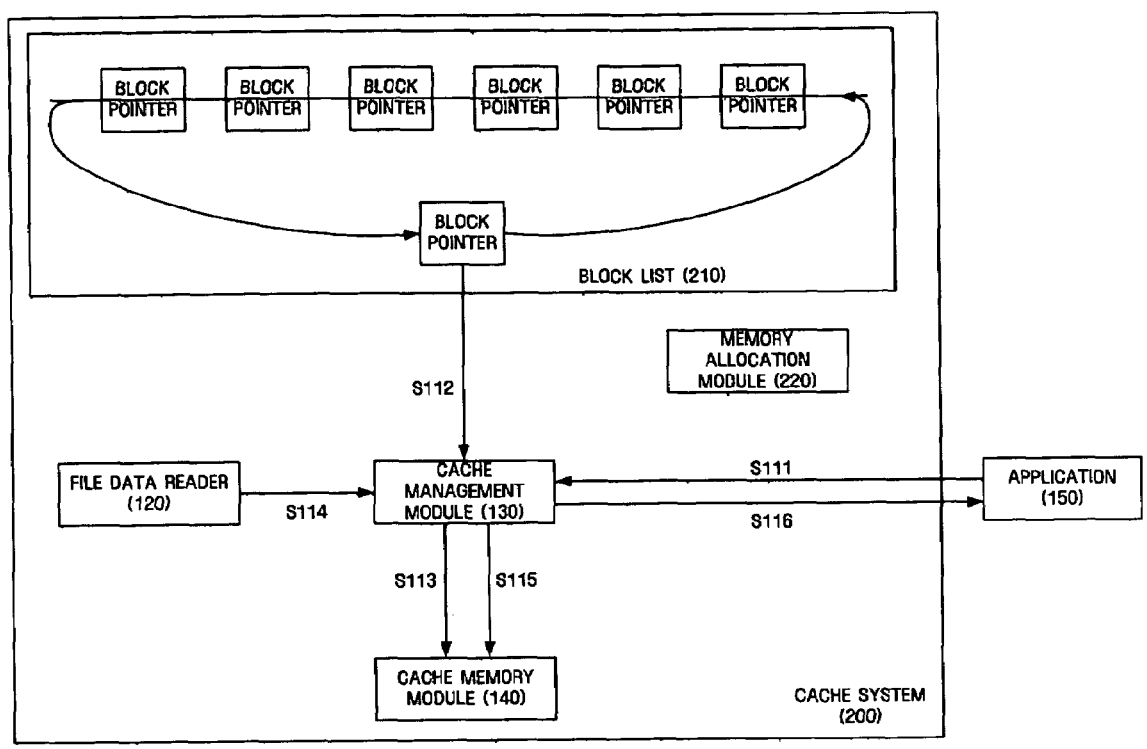
FIG. 7 is a view illustrating a procedure of allocating data to a cache if no redundant memory block exists according to an exemplary embodiment of the present invention.

FIG. 7 illustrates a procedure for allocating data to a cache if no redundant memory block exists according to an exemplary embodiment of the present invention. If no redundant memory block exists, a previously allocated memory block is required to allocate the data to the cache. Therefore, supposing that the memory blocks are linked to one another in a FIFO manner, the first allocated memory block, i.e., the memory block existing in the head of the memory block list can be reallocated. At this time, if the number of reference times is not zero, it means that the application that uses the corresponding memory block exists. Therefore, if the number of reference times is not zero, reallocation of memory block proceeds by examining the memory block existing next to the head of the memory block list. The whole procedure is as follows.

If the application 150 requests data of a specific file S111, the cache management module 130 retrieves a memory block that can be allocated from the block list 210 S112. The cache management module 130 first retrieves the head of the block list 210. At this time, if the number of reference times RefCount is not zero, it means that the memory block is used in another application. Therefore, new data cannot be allocated. The pointer of once retrieved block may additionally be stored in the last position of the list so that it can be placed in the last order during retrieval for reallocation.

The pointer retrieved through the step S112 is deleted from the cache memory module 140 S113. This is to prevent the cache memory module from referring to the corresponding block because no previous data is stored in the cache memory module any longer. Desired data is read from the file and then copied in the retrieved memory block S114. The pointer of the memory block is stored in the file map that matches the requested file S115. The cache management module 130 transmits the pointer of the memory block that stores data to the application 150. At this time, the cache management module 130 increases a value of the number of reference times of the memory block by 1. The cache management module 130 decreases the value of the number of reference times by 1 if the application 150 finishes using the memory block.

If the data requested from the application 150 is stored in the cache memory module 140, the cache management module 130 directly reads the data from the cache memory module 140 without allocating the memory block or reading the data from the file. In this case, it is possible to reduce the time required to read the data. At this time, the cache management module 130 increases by 1 the number of reference times of the memory block that stores the corresponding data, before transmitting the data to the application 150. The cache management module 130 decreases the number of reference times by 1 after transmitting the data to the application 150.

Furthermore, if a plurality of applications request access to a plurality of files, the cache management module 130 manages the memory blocks for each file and converts the memory block whose use is finished (for example, if the number of reference times is zero) to an available memory. This is suitable for the case where the mass storage file server or the streaming server provides the files to a plurality of applications.

Figure 8:
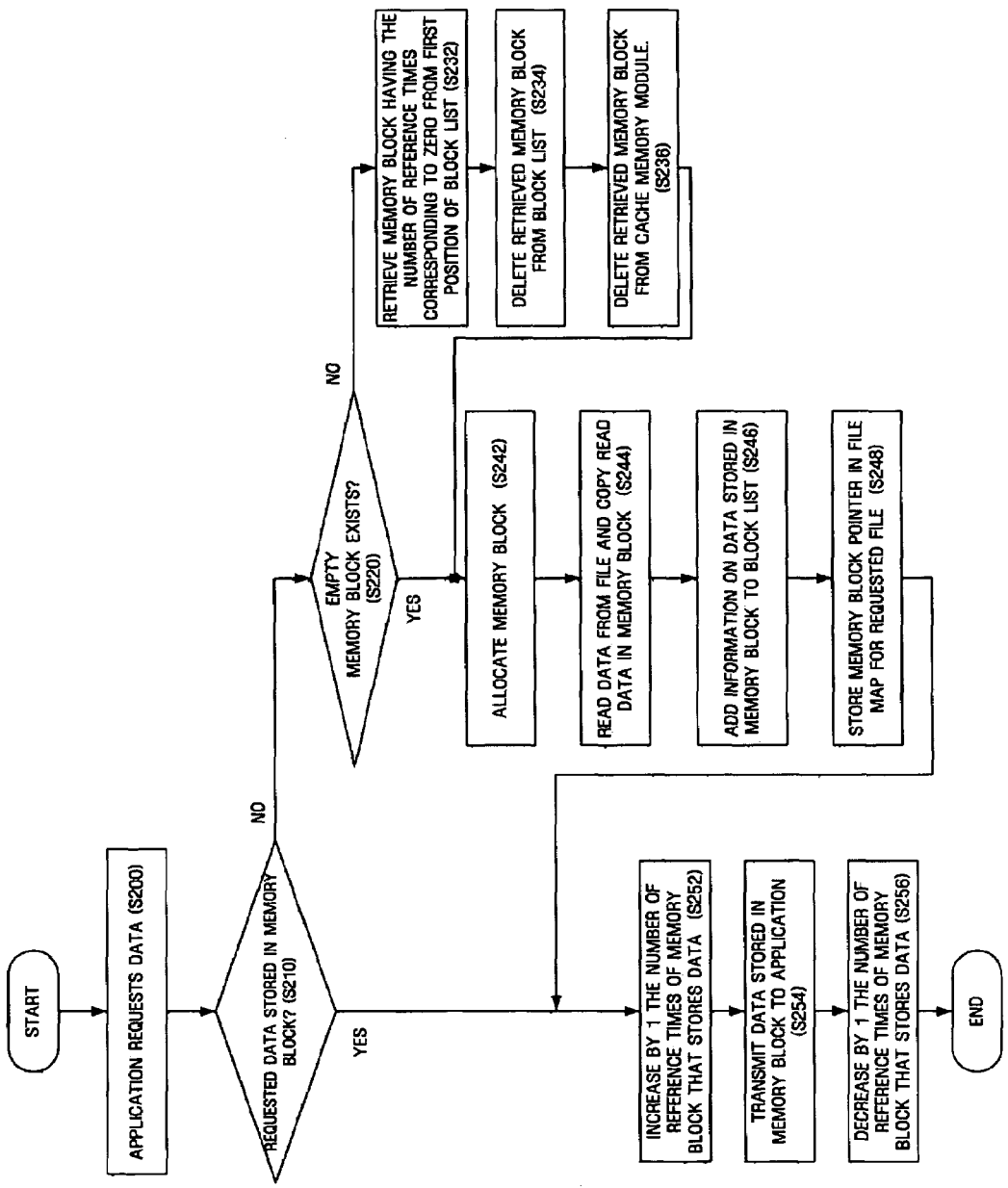
FIG. 8 is a flowchart illustrating a procedure of allocating and transmitting data in a cache system according to one exemplary embodiment of the present invention.

FIG. 8 is a flowchart illustrating a procedure of allocating and transmitting data in the cache system according to an exemplary embodiment of the present invention.

A command or signal for requesting data is received from the application S200. It is checked whether the requested data is stored in the memory block (S210). It is checked whether the data of the corresponding position in the file map has been allocated from the list of corresponding files to the memory block. If no data exists, steps S220 to S248 of storing the data in the memory block are required. To allocate a new block, it is checked whether an empty memory block exists (S220). If no empty memory block exists, steps S232 to S236 of retrieving memory blocks, which are not in use, among allocated memory blocks are implemented.

If no empty memory block exists, the memory block having the number of reference times corresponding to zero from the first position of the block list is retrieved (S232). If the number of reference times of a memory block is zero, it signifies that the memory block is not used by other applications. Therefore, the new requested data is read from the file and allocated to the memory block. The retrieved memory block is deleted from the block list (S234). The retrieved memory block is also deleted from the cache memory module (S236). Since the new data is stored, it is necessary to delete the memory block from the block list and the cache memory module. The memory block is allocated according to the above described steps.

Meanwhile, if an empty memory block exists in step S220 or the memory block is allocated through the steps S232 to S236, the data is read from the file and copied into the allocated memory block (S244). Information on the data stored in the memory block is added to the block list (S246). The information on the data includes position information of corresponding data occupied in the file. The pointer of the memory block is stored in the file map for the requested file (S248). This is to retrieve the memory block through the file map of the file if the data is requested later.

If the data requested in step S210 is stored in the memory block or if a new block is allocated through the steps S220 to S248 so that the data is stored therein, the number of reference times of the memory block that stores the data is increased by 1 (S252). This is to prevent other data from being stored in the memory block during data transmission. The data stored in the memory block are transmitted to the application (S254). If the data transmission is finished, the number of reference times of the memory block that stores the data is decreased by 1 (S256).

As described above, according to the exemplary embodiments of the present invention, since the memory blocks are formed and the map for each file is provided, a plurality of files can be stored in one cache system and the application can randomly access the file.

In addition, since the indexing function is provided, fast data retrieval can be implemented. Moreover, it is possible to protect the cache memory by indicating the number of reference times while the application uses the cache memory.

Although exemplary embodiments of the present invention have been described for illustrative purposes, persons ordinarily skilled in the art will appreciate that various modifications, additions and substitutions are possible, without departing from the scope and spirit of the invention as disclosed in the accompanying claims.

What is claimed is:

1. A cache method for storing data of a file in divided memory blocks of a cache memory, the method comprising:
    a) receiving a request command for first data of a first file from an application;
    b) retrieving a memory block that stores the first data;

c) setting reference information which indicates whether the memory block storing the first data is being used by the application;

d) transmitting the first data stored in the memory block to the application; and e) resetting the reference information for the memory block storing the first data after the d) step.

2. The cache method as claimed in claim 1, wherein the memory blocks are sequentially allocated in response to the request of the application to form a block list, and the memory blocks are linked to one another in the block list.

3. The cache method as claimed in claim 1, wherein the reference information of the memory block indicates a number of applications requesting data of the memory block, and the reference information is changed after the data is transmitted to the application.

4. The cache method as claimed in claim 1, wherein operation b) comprises retrieving a file map, which includes information on the first file, from a list of files.

5. The cache method as claimed in claim 4, wherein the file map includes information pertaining to location of the data of the first file and the memory block that stores the data of the first file.

6. The cache method as claimed in claim 1, wherein if the first data is not stored in the memory block in step b), the cache method further comprises:

allocating an empty memory block;

reading the first data from the first file and copying the read data into the allocated memory block;

adding information on the first data stored in the memory block to the block list that links the memory blocks to one another; and adding information pertaining to location of the first data in the first file and the memory block to the file map that includes the information on the file.

7. The cache method as claimed in claim 6, wherein the first file is stored in a file memory storage such as a magnetic disk.

8. The cache method as claimed in claim 6, wherein prior to the allocating the empty memory block, the cache method further comprises:

retrieving a memory block, which is not being used by other applications, from the block list;

deleting the retrieved memory block from the block list; and deleting information on second data of a second file stored in the retrieved memory block from the file map.

9. The cache method as claimed in claim 8, wherein the second data of the second file represents previously stored data on the memory block which is not being used by the other applications.

10. The cache method as claimed in claim 8, wherein a RefCount value, which indicates a number of applications using each memory block, is examined to determine whether the memory block is being used by the other applications.

11. The cache method as claimed in claim 10, wherein the RefCount value is increased by one prior to operation d).

12. The cache method as claimed in claim 11, wherein the RefCount value is decreased by one subsequent to the operation d).

13. A cache system for storing data of a file in memory blocks divided from a cache memory, the cache system comprising:

a cache memory module which stores data read from a file for each memory block;

a block allocation module which allocates the memory blocks of the cache memory module to store the data; and a cache management module which retrieves a memory block, which stores first data of a first file requested from an application, from the cache memory module, and transmits the first data stored in the retrieved memory block to the application;

wherein the memory block that stores the first data includes reference information indicating a number of applications that are using the memory block that stores the first data.

14. The cache system as claimed in claim 13, wherein the memory blocks are sequentially allocated by the request of the application to form a block list and the memory blocks are linked to one another by the block list.

15. The cache system as claimed in claim 13, wherein the reference information of the memory block indicates a number of applications requesting data of the memory block, and is changed by the cache management module after the data are transmitted to the application.

16. The cache system as claimed in claim 13, wherein the cache management module retrieves a file map, which includes information on the first file, from a list of files.

17. The cache system as claimed in claim 16, wherein the file map includes information pertaining to location of the first file and the memory block that stores the data of the first file.

18. The cache system as claimed in claim 13, further comprising:

a file data reader which reads the first data of the first file from the file;

wherein if the first data is not stored in the memory block, the cache management module is allocated with an empty memory block, the block allocation module copies the first data read by the file data reader into the allocated memory block, adds the information on the first data stored in the memory block to the block list that links the memory blocks to one another, and adds information pertaining to location of the first data in the first file and the memory block to the file map including the information on the file.

19. The cache system as claimed in claim 18, wherein the block allocation module retrieves a memory block, which is not being used by other applications, from the block list if no empty memory block exists in the cache memory module, deletes the retrieved memory block from the block list, and deletes information on second data of a second file stored in the retrieved memory block from the file map.

20. The cache system as claimed in claim 19, wherein the second data of the second file represents previously stored data on the memory block which is not being used by the other applications.

* * * * *